United States Patent [19]

Byren et al.

[11] Patent Number: 4,812,639

[45] Date of Patent: Mar. 14, 1989

[54] SELF-ALIGNING PHASE CONJUGATE LASER

[75] Inventors: Robert W. Byren, Hermosa Beach; David A. Rockwell, Santa Monica, both of Calif.

[73] Assignee: Hughes Aircraft Company, Los Angeles, Calif.

[21] Appl. No.: 810,808

[22] Filed: Dec. 19, 1985

[51] Int. Cl.[4] .............................................. G02F 1/00
[52] U.S. Cl. ........................... 250/203 R; 219/121.78; 356/29; 356/152
[58] Field of Search ........................ 356/141, 152, 29; 250/203; 244/3.16–3.18; 219/121 LU, 121 LV, 121 LW, 121 LX

[56] References Cited

U.S. PATENT DOCUMENTS

| 4,005,935 | 2/1977 | Wang | 330/4.3 |
| 4,233,571 | 11/1980 | Wang et al. | 330/4.3 |
| 4,321,550 | 3/1982 | Evtuhov | 330/4.3 |
| 4,326,800 | 4/1982 | Fitts | 250/201 |
| 4,330,204 | 5/1982 | Dye | 356/152 |
| 4,344,042 | 8/1982 | Hon | 372/19 |
| 4,429,393 | 1/1984 | Giuliano | 350/393 |

Primary Examiner—Edward P. Westin
Assistant Examiner—Charles Wieland
Attorney, Agent, or Firm—Ronald L. Taylor; V. G. Laslo; A. W. Karambelas

[57] ABSTRACT

A method and apparatus are disclosed for providing a laser beam that is automatically aligned with a substantially rigid, stabilized platform or frame that can be oriented over a wide angular range, such as by the gimbals of a laser pointing and tracking system. A single-transverse-mode master laser oscillator 12 is mounted on the stabilized platform 13 which is part of the inner gimbal, which can be rotated about an elevation axis 16, and a multipass laser amplifier 21 wiht a phase conjugation mirror 22 and an optional nonlinear frequency-conversion device 20 are located off the inner gimbal. An outer gimbal or pedestal mount permits rotation about an azimuthal axis 17. The laser oscillator 12 and laser amplifier 21 are coupled by means of a beamsplitter 15 and two reflecting elements 18 and 19. The laser media used for the oscillator 12 and amplifier 21 are either the same, or compatible media having the same wavelength. In an alternative embodiment the two reflecting elements are replaced by a flexible ligh waveguide such as a glass fiber. The phase conjugation mirror 22 compensates the beam for the effects of optical aberrations caused by thermally induced changes in the amplifier medium and the nonlinear medium (if used) and also compensates the beam for angular tilt and jitter in the beam line of sight due to structural flexibility and motion of the stabilized platform. Four different embodiments are described in which the phase conjunction mirror is based on stimulated Brillouin scattering, degenerate four-wave mixing, three-wave mixing, and photon echo effects, respectively.

20 Claims, 1 Drawing Sheet

SELF-ALIGNING PHASE CONJUGATE LASER

BACKGROUND OF THE INVENTION

1. Field of the Invention

The present invention relates to high-energy lasers used with pointing and tracking systems, and to precision laser power delivery systems. More particularly, the present invention relates to laser systems for producing an automatically aligned beam that is compensated for distortions in optical media and corrected for angular tilt and jitter in the beam line of sight due to gimbal motion and structural compliance.

2. Background Information

Many applications of laser systems demand precise control of the direction and wavefront profile of the laser beam. A wavefront is a three-dimensional surface of constant phase, at right angles everywhere to a family of rays. Typical aberrations in the profile of the wavefront include ones that alter the phase, focus, or astigmatic characteristics of the beam. Control of these distortions and the line of sight of the beam are of paramount importance in many applications involving long-distance communications, target ranging, the guidance of weapons systems, and the delivery of laser power to a remote location.

Laser pointing and tracking systems that employ off-gimbal laser devices in conjunction with gimballed tracking sensors are susceptible to pointing errors in the line of sight resulting from (1) wander in the laser beam due to thermal refractive effects and optical bench flexure in the laser itself, (2) static flexure and dynamical motion caused by thermal stresses and vibrations, respectively, and (3) angular wander of the line of sight due to bearing runout and nonorthogonality of the gimbal axes. "Wander" in a laser beam refers to changes in position of the centroid of a laser beam profile. Bearing "runout" refers to several related phenomena which have to do with the fit of the bearing race or races to a rotating shaft; for example, radial runout refers to the radial free play of the shaft in the bearing race or races, which allows the axis of the shaft to translate a certain amount parallel to itself, or to deviate from perpendicularity in its orientation with respect to the plane of the bearing. Previous laser pointing and tracking systems have attempted to control laser beam wander through good thermal management and proper structural design, through the use of folding elements such as corner cubes and roof prisms that make the alignment insensitive to changes in their positions, and more recently through the utilization of phase conjugation of the beam.

The use of phase conjugation techniques to correct laser beam wavefront distortion is known in the art and is used in order to take advantage of the benefits that result from its incorporation in laser systems. In U.S. Pat. No. 4,005,935, for example, Wang discloses a method and apparatus for providing a phase-compensated optical beam directed at a remotely located target. The effects of phase perturbations along the path to the target are substantially cancelled, and near diffraction-limited convergence of the beam on the target is obtained.

In U.S. Pat. No. 4,321,550, Evtuhov discloses a phase conjugation apparatus that corrects for optical distortion in high-power laser systems, and minimizes optical components. His system for phase conjugate correction is particularly suitable for use with an inertial confinement nuclear fusion system.

In U.S. Pat. No. 4,233,571, Wang and Yariv disclose a laser that self-corrects for distortions introduced into the laser output beam wavefronts by aberrations and time-varying phenomena internal to the laser, such as vibration of the cavity reflecting surfaces, warping of the reflecting surfaces through heating, misalignment of the reflecting surfaces, aberrations in the lasing medium, and turbulence in the lasing medium (if the medium is not a solid). The self-correction of the effects due to these causes allows higher system efficiency and performance of the system at its diffraction limit, i.e., at its optimum focusing capability.

Giuliano, in U.S. Pat. No. 4,429,393, discloses apparatus using phase conjugation at two different frequencies in a laser ring resonator for the purpose of providing a phase-compensated diffraction-limited output beam at either or both frequencies.

In U.S. Pat. No. 4,344,042, Hon discloses apparatus for a self-regenerative laser oscillator-amplifier that employs intracavity phase conjugation to provide compensation for optical inhomogeneities in strongly pumped laser media without suffering efficiency losses, in order to achieve single-mode output with increased average and/or peak power.

None of these inventions, however, directly addresses the problems of misalignment of the output beam of a gimballed laser system due to compliance in the gimbal structure, imperfections or wear in the gimbal bearings, and nonorthogonalty of the gimbal axes. Presently the problems of structural compliance and gimbal axis wander are controlled through good mechanical design and through the use of active input beam alignment systems. Typically the input beam alignment system is a closed-loop servomechanical system that uses a collimated laser source and receiver to sense the angular deviation in pointing the beam. The closed-loop servomechanical system is utilized in combination with a precision beam-steering mirror to provide vernier correction of the disturbed line of sight. Typically such input beam alignment systems can be quite complex, are limited in servo bandwidth because of reaction torque feedback, and are themselves prone to misalignment. In U.S. Pat. No. 4,326,800, Fitts discloses such a complex system for laser beam wavefront and line-of-sight error correction. Fitts uses a low-energy reference beam at the vertex of a primary mirror that is grated to diffract a low-energy holographic replica of the high-energy primary beam. A photodetector-based servo control system compares the line of sight of the reference beam to that of the low-energy replica and generates control signals which actuate a beam steering mirror to reposition the main beam. The servo control system also includes a wavefront sensor. The sensor analyzes the wavefront profile of the low-energy replica and generates control signals which actuate a deformable mirror to correct spurious wavefront aberrations.

SUMMARY OF THE INVENTION

The self-aligning phase conjugate laser provides a high-power laser beam that is automatically aligned with a stabilized platform mounted on the inner gimbal of a laser pointing and tracking system. The self-aligning phase conjugate laser uses an on-gimbal single-transverse-mode laser oscillator in conjunction with an off-gimble multipass laser power amplifier and phase conjugation mirror (commonly referred to as a phase conjugate mirror) to provide an output beam that preserves the beam quality and alignment stability of the oscillator beam. If an optional nonlinear optical device is also used, the self-aligning phase conjugate laser offers the capability of distortion-free frequency conversion, such as frequency doubling. The single-mode laser oscillator and high-power laser amplifier are optically coupled by means of a beamsplitter and two reflective folding elements. In an alternative embodiment the two reflecting elements are replaced by a flexible optical waveguide device such as a glass or plastic fiber that utilizes total internal reflection to "pipe" the light to a target location. The phase conjugation mirror in the configuration described above compensates for both the optical aberrations in the beam caused by distortions in the amplifier medium (and frequency-conversion medium, if used) as well as angular tilt and jitter in the beam line of sight due to motion of the gimballed platform and compliance in its structure. The phase conjugation mirror can take on several different forms, such as devices that make use of stimulated Brillouin scattering, degenerate four-wave mixing, three-wave mixing, and photon echo effects.

The undesirable features of active input beam alignment systems are avoided by the passive, self-aligning phase conjugation laser system disclosed in the present invention, which provides extremely wide-bandwidth compensation of all beam wander and misalignment effects. The present invention eliminates the need for complex input beam alignment systems and relaxes structural design constraints on the laser and gimbal.

The self-aligning phase conjugate laser provides a high-power laser beam that is automatically aligned with the gimballed platform of a laser pointing and tracking system. It is able to compensate for angular deviations and jitter in the beam line of sight caused by gimbal motion and structural compliance. It eliminates the need for complex electromechanical servo systems that are limited in response bandwidth by reaction torque feedback and are themselves prone to misalignment. In addition, use of the self-aligning phase conjugate laser relaxes the stiffness constraints on the laser and gimbal structures.

The subject invention thus represents a completely new approach to beam alignment for laser pointing and tracking systems. The advantages of the passive, phase conjugation approach to autoalignment include (1) compensation of high-frequency jitter, (2) higher system reliability since additional servomechanisms are not required, (3) decreased system size and weight, and (4) lower development and production costs. Because of the improved performance at reduced cost, a multitude of potential applications can be envisioned.

The versatility of application of the subject invention should be apparent from considering two possible applications on vastly different size scales. At one extreme, for example, the gimballed platform of the subject invention might be on a satellite moving in orbit high above the earth's atmosphere, with the high-power laser amplifier being based on the earth's surface. At the other extreme, a surgeon's hand might be the equivalent of the gimballed platform referred to in the present invention, with a high-power medical laser providing a beam through a flexible optical waveguide to be directed by the finger, hand, and arm muscles of the surgeon in the performance of some delicate and precise operation.

Accordingly, it is one object of the present invention to provide a high-power laser beam that is automatically aligned with the platform or frame of a pointing and tracking system, or with the directed end of an optical fiber in a precision laser power delivery system.

It is another object of the present invention to provide a high-power laser beam capable of being directed over a wide angular range without the use of complex and cumbersome closed-loop servomechanical input beam alignment systems.

It is yet another object of the present invention to provide a high-power gimbal-oriented laser beam that is compensated over an extremely wide bandwidth for all beam wander and misalignment effects, thus eliminating the need for strict stiffness constraints on the laser and gimbal structures.

An appreciation of other aims and objects, along with a more complete understanding of the present invention, may be achieved through the study of the following description of a preferred embodiment in addition to reference to the accompanying drawing.

BRIEF DESCRIPTION OF THE DRAWING

The sole FIGURE is a schematic diagram showing the disposition of the various components of a preferred embodiment of the present invention.

DESCRIPTION OF A PREFERRED EMBODIMENT

Figure 1:
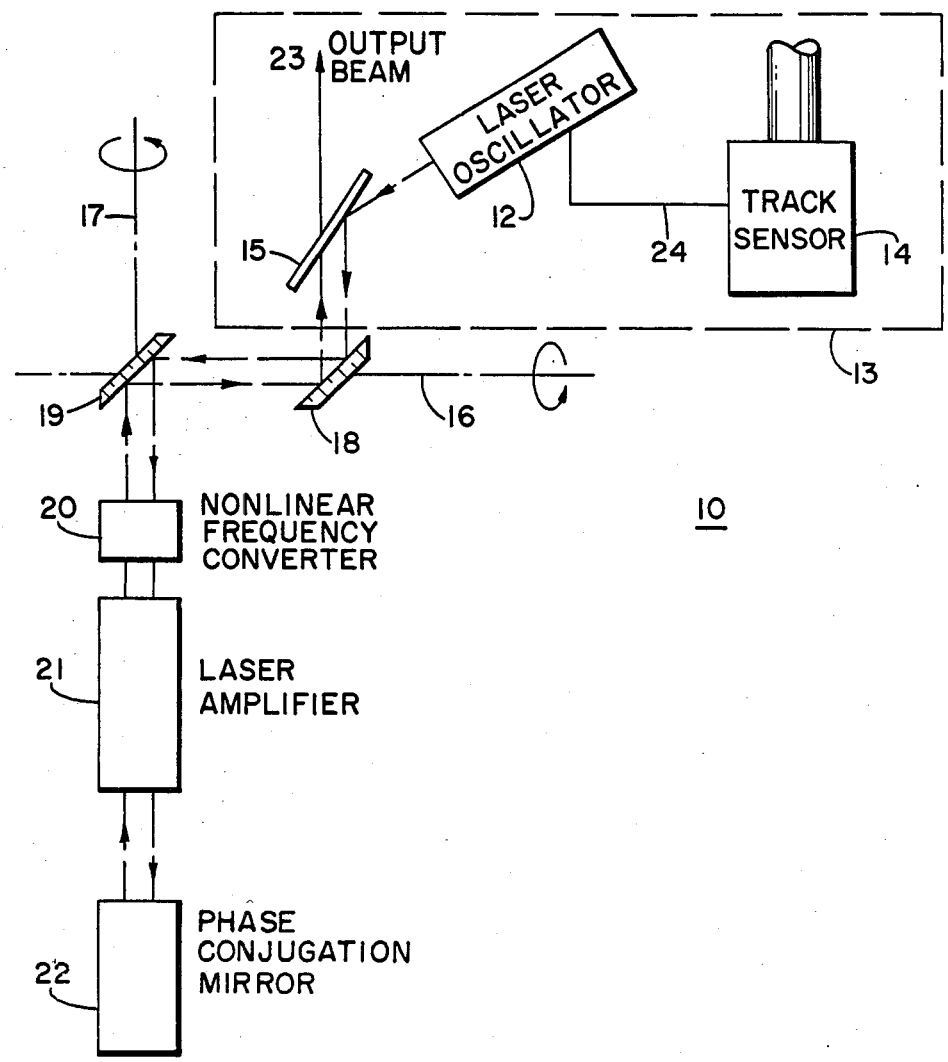

Referring to the figure, a preferred embodiment of the self-aligning phase conjugate laser 10 is shown, including a single-transverse-mode laser oscillator 12 mounted on a stabilized platform 13 which is part of the inner gimbal of a laser pointing and tracking system or precision laser power delivery system. The stabilized platform 13 serves as an optical bench on which are also mounted a tracking sensor 14 and a beamsplitter 15. The tracking sensor 14 is typically a television camera tube or forward-looking infrared (FLIR) sensor to provide a means of generating angular error signals to be used by servomechanical systems to point the stabilized platform 13 located on the inner gimbal of the pointing and tracking system. Mounting the single-mode laser oscillator 12, the track sensor 14, and the beamsplitter 15 on the same substantially rigid, stabilized platform 13 which constitutes part of the inner gimbal allows the minimization of misalignment errors and jitter arising from structural compliance. The high-quality laser oscillator beam exits the inner gimbal stabilized platform 13 by reflection off the beamsplitter 15, which is a partially reflecting planar surface. After reflection off the beamsplitter 15 the high-quality single-transverse-mode laser oscillator beam passes through the structural framework (or its equivalent in the alternative embodiment) comprising the gimbal axes 16 and 17 by reflections off two reflecting elements 18, 19 and possibly some additional folding or relaying reflective elements (not shown). In one possible embodiment the reflecting elements 18 and 19 are "full-angle" reflecting elements, so named because they are disposed to give an amount of angular deviation of a reflected beam equal to the angle through which the element rotates. The reflecting element 18 is attached to the inner gimbal of the pointing and tracking system but is not part of the stabilized platform 13. The relecting element 19 is attached to an outer gimbal or pedestal mount, depending on the particular embodiment of the pointing and tracking system. There may also be additional reflecting elements to fold the optical path between reflecting elements 18 and 19. The reflecting elements can be chosen from a variety of conventional metallized or dielectric-coated mirrors or total-internal-reflection prisms designed to give maximum reflection over a range of wavelengths that includes the laser oscillator wavelength.

In an alternative embodiment, the two reflecting elements 18 and 19 are replaced by a flexible optical waveguide such as a glass or plastic or other type of optically transmissive fiber which makes use of the phenomenon of total internal reflection to effect a "piping" of the laser radiation from one end of the waveguide to the other. This alternative embodiment makes use of the flexible nature of an optically transmissive fiber to couple the light beams going back and forth between the stabilized platform 13 and the off-gimbal laser amplifier 21 or nonlinear frequency conversion device 20. Such as alternative embodiment would be particularly appropriate in cases where it is desirable to deliver laser power to a relatively small target area, as in laser surgery or laser microfabrication techniques. In the case of laser surgery, the hand of the surgeon would be the equivalent of the stabilized platform referred to in the first preferred embodiment.

For some applications the low-power, high-quality laser oscillator beam will pass through a nonlinear frequency-converting device 20, but will not undergo frequency conversion in any significant amount because of the relatively low energy density in the beam. A laser power amplifier 21 comprising one or more segments (only one is shown) provides high gain at the oscillator wavelength. The wavefront of the laser beam emerging from the laser power amplifier 21 will be aberrated because of thermal lensing in the medium of the laser power amplifier and also in the medium of the nonlinear frequency-converting device 20 (if one is present). Aberrations may also be introduced by beam wander due to inhomogeneities in the power amplifier and frequency converter media. Furthermore, this same beam will be misaligned because of flexibility in the structure associated with the gimbals, will wander because of wear or inherent manufacturing imperfections in the bearings, and will wander in its line of sight because of nonorthogonality effects in the gimbal axes, such as the gimbal axes not being orthogonal to one another.

The phase conjugation mirror 22 generates a counter-propagating beam whose wavefront is the complex phase conjugate image of the incident wavefront. The phase conjugation mirror 22 can have different embodiments according to the mechanism whereby the nonlinear optical medium employed in it produces the phase conjugate image of the beam incident on it.

In one embodiment, the phase conjugation mirror 22 is a device based on the effect known as stimulated Brillouin scattering. Acoustic waves are set up in a nonlinear optical medium such as pressurized methane, tetrafluoromethane, or carbon disulfide. Any nonlinear optical medium which can be used for Brillouin scattering, whether it is a solid, liquid, or a gas, may be employed. The acoustic waves are produced through the process of electrostriction, which involves the interaction between the large electric field intensities present in the incident beam and the nonlinear scattering medium. The density of the scattering medium is periodically modulated by the electrostriction process, and acoustic waves are set up in response to the electric field. This process requires sufficient optical energy, such as can be furnished by a laser, because there is a power threshold below which stimulated Brillouin scattering will not occur. The acoustic waves which are generated in the scattering medium are produced in a time interval on the order of nanoseconds, which is extremely fast compared to the times associated with turbulence, thermal conduction, the propagation of mechanical disturbances, and many allied phenomena. Within the stimulated Brillouin scattering medium, the acoustic waves that are set up conform identically to the incident optical wavefronts, and act as reflecting surfaces for the wavefronts that impinge on the acoustic waves. Light waves that impinge on the acoustic waves are reflected so that their wavefronts become the complex phase conjugate image of the incident wavefronts. A frequency shift arising from the Doppler effect occurs in the retroreflection of light waves from the receding acoustic waves in the stimulated Brillouin scattering medium. This shift is on the order of 1 part in 100,000 and does not affect performance.

Therefore, when the phase-conjugated beam traverses the laser amplifier 21, the nonlinear frequency-converting device 20, and the gimbal optics 18 and 19, any any optical aberrations and angular misalignments of the beam apparent after the first pass are perfectly compensated. After a second pass through the laser power amplifier 21, the beam has sufficient intensity to be efficiently converted by the nonlinear frequency-converting device 20 if one is used. The output beam 23, which is outcoupled through the beamsplitter 15, exhibits the optical quality and alignment accuracy of the on-gimbal laser oscillator 12 mounted on the stabilized platform 13, regardless of any line-of-sight jitter or optical distortion introduced by the amplifier medium, nonlinear medium, and the gimbal system.

If polarization-sensitive elements are employed, such as a nonlinear frequency converting crystal for 20, a means of polarization de-rotation is required to compensate the polarization rotation caused by the motion of the reflecting elements 18 and 19. A pair of quarter-wave plates or rhomboidal prisms, one located between the beamsplitter 12 and the reflecting element 18 and the other located between the reflecting element 19 and the nonlinear frequency converting device 20, will accomplish the required polarization de-rotation.

The laser oscillator 12 and laser power amplifier 21 employ either the same type of gain medium, or compatible types having the same wavelength, as a result of their gain curves overlapping at least in part. Possible gain media may include a crystal, such as ruby or neodymium-doped yttrium aluminum garnet (YAG); a doped glass, such as neodymium-doped glass; a semiconductor, such as gallium arsenide; a gas, such as carbon dioxide; a liquid containing a fluorescent dye, such as rhodamine 6G; or other gain media known in the art. The gain medium in either case (in laser oscillator 12 or in power amplifier 21) is excited by an appropriate conventional means not shown, such as the light from a xenon flashlamp, a high-voltage electrical discharge, a high-energy electron beam, or another laser. An example of the use of compatible gain media would be the use of a 1.06-micrometer laser diode such as indium gallium arsenide as the oscillator 12 located in the hand-held portion of a laser surgical instrument, with a 1.06-micrometer neodymium:YAG or neodymium:glass laser amplifier 21 remotely located and coupled to the hand-held portion of the instrument with a glass fiber waveguide.

The phase conjugation mirror 22 may take on different forms in different embodiments of the self-aligning phase conjugate laser 10 as claimed below. Besides the process of stimulated Brillouin scattering used in the first embodiment described above, other embodiments may be envisioned in which use is made of the phenomena commonly referred to as degenerate four-wave mixing, three-wave mixing, and photon echo effects. All these phenomena are described in articles and books covering the topic of nonlinear optics, such as, for example, the third edition of the book entitled *Optical Electronics*, written by Amnon Yariv and published in 1985 by Holt, Rinehart, and Winston in New York; the article "Nonlinear Optical Phase Conjugation," by D. M. Pepper, in *The Laser Handbook*, volume 4, edited by M. Bass and M. Stitch and published by North-Holland in New York in 1985; and the book *Optical Phase Conjugation* by R. A. Fisher, published by Academic Press in New York in 1985. Embodiments of phase conjugation mirrors utilizing three-wave mixing, degenerate four-wave mixing, and photon echo effects are known in the art and are described in various U.S. Patents such as U.S. Pat. No. 4,321,550—Evtuhov and U.S. Pat. No. 4,233,571—Wang and Yariv.

The first embodiment of the phase conjugation mirror 22 is a stimulated Brillouin scattering device, in which an incident wavefront that has been deformed by some optical aberration sets up acoustic waves in a suitable medium such as pressurized methane, tetrafluoromethane, or carbon disulfide. The acoustic waves are produced by electrostriction, a process in which the very large electric field intensitites in the incident laser beam interact with the medium. The density of the medium is periodically modulated by the electrostriction process in a time extremely small compared to that of any mechanism that may have caused the distorted wavefronts of the incident light waves. The periodic density variations associated with the acoustic waves serve as reflecting surfaces for the aberrated wavefronts impinging on the acoustic waves. The complex phase conjugate image of the incident optical wavefront is reflected, and when the reflected wave reencounters the aberration that initially caused the deformation, the distorted wave is corrected as it passes the aberration.

The second embodiment of the phase conjugation mirror 22 employs the process of degenerate four-wave mixing to accomplish the wavefront correction. Two pump waves, emitted by either two identical lasers having the same wavelength or one laser in combination with a beamsplitter arrangement, produce coherent optical beams which are incident on a nonlinear medium from opposite directions. A phase hologram is set up in the medium by the interaction of the two pump waves and an aberrated wavefront with the medium. The aberrated wavefront incident on the medium is reflected as the phase conjugate waveform. Alternatively, an appropriate absorbing or amplifying medium is used which results in amplitude holograms being established in the medium and this leads to the phase conjugation process.

The third embodiment makes use of the process of three-wave mixing, often referred to as parametric downconversion. The incident aberrated wavefronts strike a nonlinear medium, and in addition, an external laser emits waves of a pump frequency which is twice that of the aberrated waves and which are also made incident on the medium from the same direction. The interaction of the waves and the medium produces the phase conjugate waveform, which is propagated through the nonlinear medium. This waveform is then transmitted back along the initial optical path of the incident aberrated wavefront by conventional means.

Yet another embodiment utilizes the process of photon echoes to produce phase conjugate reflected wavefronts. This process is akin to stimulated Brillouin scattering, except that the nonlinear medium is different. In the photon echo process, an incident aberrated wavefront deforms the medium. A laser pulse emitted by an external laser that impinges on the same medium at a later time is reflected as the complex phase conjugate waveform of the aberrated incident waveform. This process is extremely fast, even faster than the process involving stimulated Brillouin scattering. The process takes place within several centimeters of the surface of the nonlinear medium on which the aberrated wavefronts are incident.

The nonlinear frequency-converting device 20 can take on different forms according to the exact physical mechanism employed, although most of them rely on the nonlinear optical properties of certain media. Two such mechanisms are frequency doubling, also known as second harmonic generation, and stimulated Raman scattering.

The explanation of frequency conversion effects in nonlinear optical media lies in the way a beam of light propagates through a dielectric medium. A material medium consists of atoms or molecules whose nuclei and associated electrons form electric dipoles. Electromagnetic radiation in the form of a light beam interacts with these dipoles and causes them to oscillate. These oscillating dipoles themselves act as sources of electromagnetic radiation. If the amplitude of vibration of the dipoles is small, the radiation they emit has the same frequency as that of the incident radiation. As the intensity of the incident radiation increases, however, nonlinear effects eventually come into play which produce harmonics of the frequency of oscillation of the dipoles. The second and strongest frequency harmonic is at twice the frequency of the incident radiation. Not all solids exhibit frequency doubling; the phenomenon is not observed for solids that have a center of symmetry in their structure. In crystals which do produce frequency-doubled light, dispersion causes the frequency-doubled light to travel at a different velocity than the light whose frequency is not doubled. Destructive interference effects result in periodic variations in the intensity of the frequency-doubled light through the crystal. If the speeds of propagation of the beams can be made equal, a more powerful frequency-doubled beam is obtained. A technique for speed equalization, also known as phase matching, can be achieved using birefringent crystals for which the dispersion is less than the birefringence. Crystals of ammonium dihydrogen phosphate (ADP) and potassium dideuterium phosphate (KD*P) belong to this group of materials and are commonly used for second harmonic generation in commercial laser systems, where efficiencies of 20 to 30 percent have been achieved. Several new materials present the possibility of higher conversion efficiency. Lithium niobate yields a high conversion efficiency but has an index of refraction which depends strongly on laser power. This effect is known as optical damage and in lithium niobate is known not to occur above 160 degrees Centigrade. Frequency doublers employing lithium niobate must be kept in an oven with an accurately controlled temperature for phase matching. Another material, barium sodium niobate, has an even higher frequency conversion efficiency and does not appear to suffer from optical damage.

Another effect that can be used in frequency conversion is stimulated Raman scattering. In the ordinary Raman effect a photon of an incident light beam is scattered by a molecule and emerges with a different wavelength. For a monochromatic beam, there will be more than one shifted spectral line, in general. If an emitted line has a wavelength longer than that of the incident beam, it is called a "Stokes line." An emitted spectral line with a wavelength shorter than that of the incident beam is called an "anti-Stokes line." The difference in energy between the emitted and incident photons is due to changes in vibrational, electronic, spin, and rotational levels of the molecule, with a decrease in energy corresponding to the Stokes line and an increase in energy corresponding to the anti-Stokes line. The scattered beams at particular wavelengths appear in well-defined cones about the direction of the incident beam. In stimulated Raman scattering the photons emitted in the ordinary Raman effect are made to stimulate further Raman emissions. With strong pumping of a Raman-active medium by a laser, gain can achieved at the wavelengths corresponding to the Stokes and anti-Stokes spectral lines. This pumping can be used to set up oscillations at these wavelengths. Hydrogen, deuterium, and methane are some of the molecular gases which have been used, usually under pressure because the effect is enhanced with increased density of the gas.

Experimental results demonstrate that a passive phase conjugation mirror effectively compensates for laser beam wander. A Nd:YAG laser pulsed at 5 Hertz, a scanning prism to induce beam wander, and a simple phase conjugation mirror comprising a focusing lens and a cell containing pressurized methane were used to show that a root-mean-square beam wander as large as approximately 4 milliradians is reduced to the approximately 10-microradian residual beam wander of the original laser. Furthermore, this compensation capability of nearly three orders of magnitude (a factor of 1000, or ten raised to the third power) does not constitute a fundamental limit. Compensation for even greater beam wander was not attempted because the amount of compensation achieved is estimated to exceed the requirement for beam wander compensation that might be encountered in practical laser oscillator-amplifier systems of high average power. Results were also obtained showing that the phase conjugate mirror compensates for aberrations that might exist in the optical path. Using a poor-quality optical element in conjunction with a conventional mirror increased the beam divergence by a factor of three, but produced a negligible increase in beam divergence of less than 10 percent when used with the phase conjugate mirror.

Although the present invention has been described in detail with reference to a particular preferred embodiment, persons having ordinary skill in the art will appreciate that various modifications and alterations may be made without departing from the spirit and scope of the invention.

What is claimed is:

1. Apparatus for automatically aligning a beam of radiation with a pointing device comprising:
   a radiation emission means which is mechanically, fixedly coupled to said pointing device, such that substantially all rotation and translation of said pointing device is simultaneously and synchronously experienced by said radiation emission means;
   nonlinear phase conjugate reflecting means which is mechanically decoupled from said pointing device; and
   radiation coupling means disposed between said emission means and said phase conjugate reflecting means for conveying emitted radiation from said emission means to said phase conjugate reflecting means such that any aberration induced into said emitted beam by a motion of said pointing device is substantially compensated for by said phase conjugate reflecting means.

2. Apparatus as claimed in claim 1 in which said radiation emission means is a laser.

3. Apparatus as claimed in claim 1 in which said pointing device is a tracking sensor which scans for an external radiation beam and locks on to said external radiation beam once said external radiation beam is sensed.

4. Apparatus as claimed in claim 1 in which said radiation emission means and said pointing device are rigidly and mechanically connected to a common frame.

5. Apparatus as claimed in claim 4 in which said common frame is an inner gimbal of a laser weapon system.

6. A laser system comprising:
   a pointing and tracking sensor mounted on a movable gimbal, said sensor being capable of being aligned with a remote target;
   a laser oscillator capable of emitting a coherent beam, said laser being mounted on said movable gimbal;
   focusing means for steering said coherent beam to said remote target; and
   laser amplifier means for amplifying said coherent beam, automatically aligning said coherent beam, controlling beam wander, and compensating for high frequency jitter, said laser amplifier means being mounted off of said movable gimbal and wherein said focusing means is operable for conveying at least a portion of said coherent beam to said laser amplifier means.

7. A laser system as claimed in claim 6 in which said laser oscillator is a single transverse mode laser oscillator.

8. A laser system as claimed in claim 6 in which said focusing means includes a beamsplitter and a plurality of folding mirrors.

9. A laser system as claimed in claim 6 in which said focusing means includes a polarizing output coupler.

10. A laser system as claimed in claim 6 in which said focusing means includes a flexible optical waveguide.

11. A laser system as claimed in claim 6 in which said laser amplifier means further includes a phase conjugation means for amplifying said coherent beam.

12. Apparatus as claimed in claim 11 in which said phase conjugation means employs Brillouin scattering for amplifying said coherent beam.

13. Apparatus as claimed in claim 11 in which said phase conjugation means employs parametric down-conversion for amplifying said coherent beam.

14. Apparatus as claimed in claim 11 in which said phase conjugation means employs four-wave mixing for amplifying said coherent beam.

15. Apparatus as claimed in claim 11 in which said phase conjugation means employs photon echo effects for amplifying said coherent beam.

16. Apparatus as claimed in claim 6 which further includes a frequency conversion means.

17. Apparatus as claimed in claim 16 in which said frequency conversion means is a frequency doubling device.

18. Apparatus as claimed in claim 17 in which said frequency conversion means employs stimulated Raman scattering.

19. A tracking and laser fire control system for finding a target and firing a laser beam at said target comprising:
- a movable gimbal mounted on a platform;
- a pointing and tracking sensor mounted on said movable gimbal;
- a single transverse mode laser oscillator mounted on said movable gimbal;
- focusing means mounted on said movable gimbal for pointing said laser beam at said remote target;
- a nonlinear frequency converter mounted on said platform;
- a laser amplifier mounted on said platform;
- a passive phase conjugation cell mounted on said platform;
- said sensor being capable of receiving external radiation, comparing said external radiation to a plurality of signal characteristics stored electronically in said sensor, and transmitting an activation signal to said laser oscillator if said received external radiation correlates positively with said plurality of stored signal characteristics in order to deliver a high energy laser beam to said target simultaneously with said target's acquisition by said sensor.

20. A method for delivering laser energy to a remote target including the steps of:
- placing a reference laser oscillator on a common, stabilized, rigid, movable platform that is controlled by a pointing mechanism together with a tracking sensor mounted on said platform; and
- ensuring that an output beam originating from said reference laser oscillator, passing through a plurality of directing elements that are mounted off said platform, and passing through a laser amplifier mounted off said platform is aligned with a line-of-sight direction that corresponds to a target direction dictated by said tracking sensor mounted on said platform by
- employing a time reversal technique that reverses the direction of propagation of an aberrated wavefront impinging upon a time reversal device; said aberrated wavefront being generated by said reference laser oscillator and a laser power amplifier mounted off said platform; while concomitantly preserving said impinging aberrated wavefront without inverting said aberrated wavefront relative to said time reversal device.

* * * * *